(12) United States Patent
Jackson et al.

(10) Patent No.: US 9,521,105 B2
(45) Date of Patent: Dec. 13, 2016

(54) SENDING COMMUNICATIONS TO CONTACTS ON A SOCIAL NETWORKING SERVICE

(71) Applicant: Google Inc., Mountain View, CA (US)

(72) Inventors: Dean K. Jackson, Pittsburgh, PA (US); Tyler J. Potter, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 325 days.

(21) Appl. No.: 13/792,493

(22) Filed: Mar. 11, 2013

(65) Prior Publication Data

US 2013/0254309 A1 Sep. 26, 2013

Related U.S. Application Data

(60) Provisional application No. 61/615,447, filed on Mar. 26, 2012.

(51) Int. Cl.
*G06F 15/16* (2006.01)
*H04L 12/58* (2006.01)

(52) U.S. Cl.
CPC .............. *H04L 51/32* (2013.01); *H04L 51/20* (2013.01)

(58) Field of Classification Search
CPC ................................. H04L 51/20; H04L 51/32
USPC .. 709/203–204, 206, 217, 219; 715/751–753
See application file for complete search history.

(56) References Cited

U.S. PATENT DOCUMENTS

| | | | |
|---|---|---|---|
| 7,593,740 B2 | 9/2009 | Crowley et al. | |
| 2007/0282621 A1 | 12/2007 | Altman et al. | |
| 2009/0164459 A1* | 6/2009 | Jennings | H04W 4/02 707/999.005 |
| 2009/0248807 A1 | 10/2009 | Fron et al. | |
| 2010/0070577 A1* | 3/2010 | Relyea | G06Q 10/10 709/204 |
| 2010/0228590 A1* | 9/2010 | Muller et al. | 705/10 |
| 2010/0293029 A1 | 11/2010 | Olliphant | |
| 2011/0119133 A1 | 5/2011 | Igelman et al. | |
| 2011/0126109 A1 | 5/2011 | Fish | |
| 2012/0226757 A1* | 9/2012 | McFarland | H04W 4/023 709/206 |
| 2015/0005010 A1* | 1/2015 | Zhang | H04W 4/023 455/456.3 |

FOREIGN PATENT DOCUMENTS

CN 101827177 9/2010

OTHER PUBLICATIONS

International Search Report and Written Opinion; May 21, 2013; World Intellectual Property Organization (WIPO) (International Bureau of); PCT/US2013/30388; 12 pages.

(Continued)

*Primary Examiner* — Oanh Duong
(74) *Attorney, Agent, or Firm* — Fish & Richardson P.C.

(57) ABSTRACT

Sending communications to contacts on a social networking service includes receiving a target geographical location of a computing device, identifying a vicinity based on the target geographical location, using the vicinity to identify a set of contacts associated with an account on a social networking service, where the set of contacts are used to produce a contact list that excludes one or more contacts that are not associated with locations within the vicinity, and sending a communication to members of the contact list, where the communication relates to the target geographical location.

18 Claims, 6 Drawing Sheets

(56) References Cited

OTHER PUBLICATIONS

International Preliminary Report on Patentability for International Application No. PCT/US2013/30388, mailed Oct. 9, 2014, 7 pages.
Extended European Search Report issued in European Application No. 13767263.0 on Oct. 21, 2015, 8 pages.
Office Action issued in Chinese Application No. 201380024700.8 on May 5, 2016, 16 pages (with English translation).

* cited by examiner

SENDING COMMUNICATIONS TO CONTACTS ON A SOCIAL NETWORKING SERVICE

CROSS-REFERENCE TO RELATED APPLICATION

Priority is hereby claimed to U.S. Provisional Application No. 61/615,447, which was filed on Mar. 26, 2012. The contents of U.S. Provisional Application No. 61/615,447 are hereby incorporated by reference into this disclosure.

TECHNICAL FIELD

This disclosure relates generally to sending communications to contacts on a social networking service.

BACKGROUND

Internet-based social networks provide a digital medium for users to interact with one another and to share information. For examples, users are able to distribute electronic content (e.g., textual comments, digital images, digital videos, digital audio, hyperlinks to Web sites, etc.) to other users that they might be connected with in the social network. Electronic content that is distributed to a user can be displayed to the user in a content stream in a home (or "stream") page.

SUMMARY

This disclosure describes techniques for sending communications to contacts on a social networking service.

An example technique includes receiving a target geographical location of a computing device, identifying a vicinity based on the target geographical location, using the vicinity to identify a set of contacts associated with an account on a social networking service, where the set of contacts are used to produce a contact list that excludes one or more contacts that are not associated with locations within the vicinity, and sending a communication to members of the contact list, where the communication relates to the target geographical location. The foregoing example technique may include one or more of the following features, taken either alone or in combination.

Identifying the set of contacts may include searching for words associated with the vicinity among contacts and selecting contacts who have the words associated with the vicinity.

Receiving the target geographical location may include retrieving the target geographical location from an index that is accessible through the social networking service. Receiving the target geographical location may include obtaining a current location of the computing device from a geo-location service and correlating the current location to the target geographical location. Receiving the target geographical location may include consulting a database including check-in information, where the check-in information includes a current location of the computing device that corresponds to the target geographical location.

The foregoing example technique may include refining membership of the contact list based, at least in part, on a social graph of a user associated with the computing device. Identifying the vicinity may include identifying a subject matter of the communication, and searching a database for a vicinity that corresponds to the subject matter. The set of contacts may include members of the social networking service who are known to be in a vicinity of the target geographical location.

Another example technique includes defining a group of contacts in a social networking service, where the group of contacts are defined based on geography; obtaining a target location of a computing device, where the target location is defined by a name associated with the target location; using the target location to obtain a set of contacts associated with an account on a social networking service, where the set of contacts are used to produce a contact list that includes the group of contacts; and sending a communication to the contact list, where the communication relates to the target location. The foregoing example technique may include one or more of the following features, taken either alone or in combination.

Obtaining the target location may include retrieving the target location from a profile that is accessible through the social networking service. Obtaining the target location may include obtaining a current location of the computing device using a geo-location service and correlating the current location to the target location. The communication may relate to an event at the target location.

All or part of the systems and techniques described herein may be implemented as a computer program product that includes instructions that are stored on one or more non-transitory machine-readable storage media, and that are executable on one or more processing devices. All or part of the systems and techniques described herein may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF THE DRAWINGS

Like reference symbols in the various drawings indicate like elements.

DETAILED DESCRIPTION

Described herein is a system for sending communications to contacts on a social networking service. In an implementation, the system may include obtaining a target location of a computing device, such as a smartphone. The target location may defined by name. The system uses the target location to identify a list of social contacts associated with an account on the social networking service. The contact list excludes one or more contacts that are not within a predefined vicinity of the target location. The system sends an electronic communication to contacts on the contact list. For example, the communication may relate to an event that is associated with the target location.

By identifying contacts by location name, it is possible to identify contacts within a particular area that are actually able to participate, e.g., in an event. The communication may be limited to those contacts, thereby sparing other social contacts from receiving communications for events that they would not likely be able to attend, or other things in which they would not likely participate.

The systems described above may be implemented in an appropriate network environment, with appropriate devices and computing equipment. An example of such an environment is described below.

Figure 1:
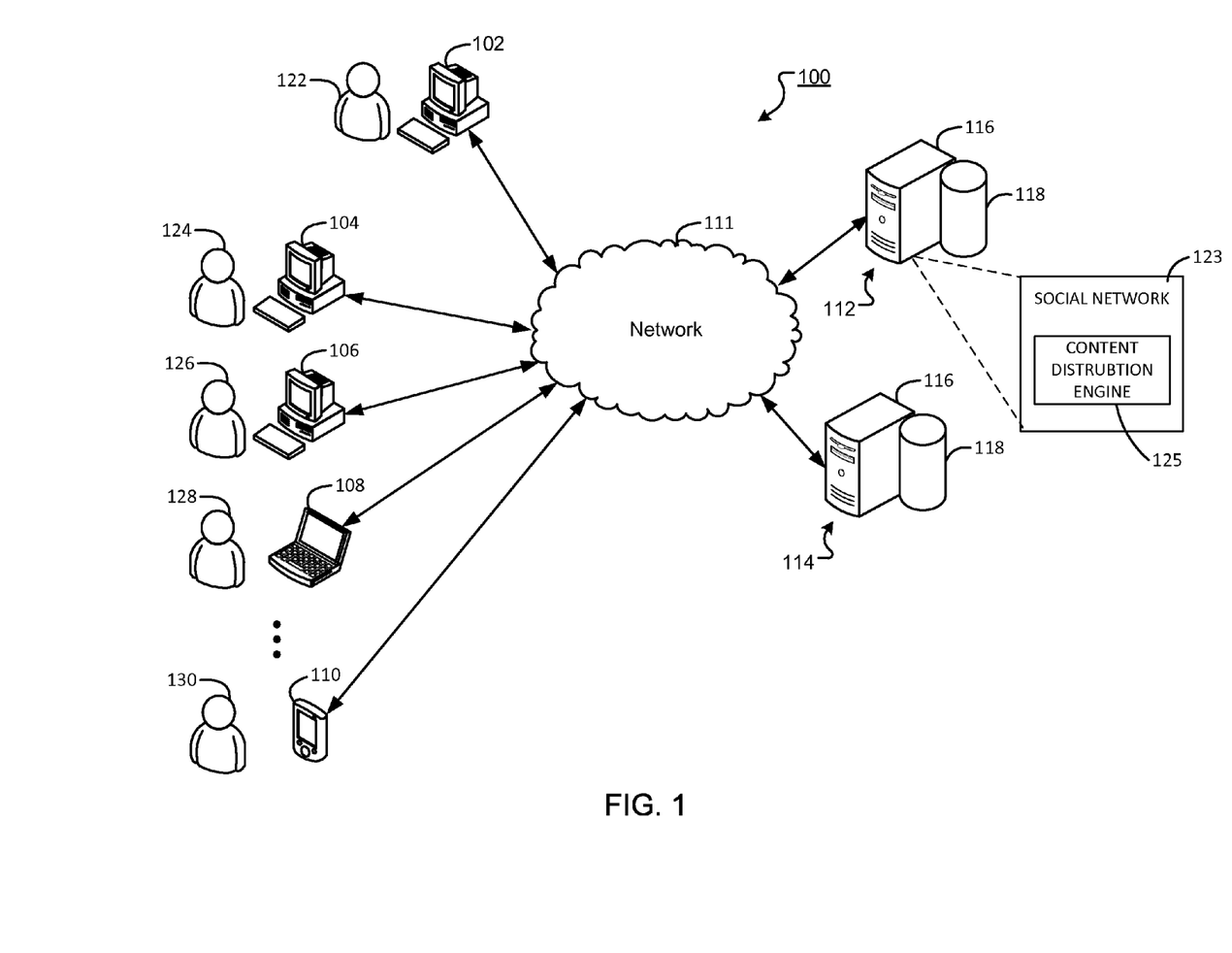
FIG. 1 is a block diagram showing an example of network environment on which the process described herein may be implemented.

FIG. 1 is a block diagram showing an example of a network environment 100 on which the systems described herein may be implemented. Network environment 100 includes computing devices 102, 104, 106, 108, 110 that are configured to communicate with a first server system 112 and/or a second server system 114 over a network 111. Computing devices 102, 104, 106, 108, 110 have respective users 122, 124, 126, 128, 130 associated therewith. The first and second server systems 112, 114 each includes a computing device 116 and a machine-readable repository, or database 118. Example environment 100 may include many thousands of Web sites, computing devices and servers, which are not shown.

Network 111 may include a large computer network, examples of which include a local area network (LAN), wide area network (WAN), the Internet, a cellular network, or a combination thereof connecting a number of mobile computing devices, fixed computing devices, and server systems. The network(s) included in network 111 may provide for communications under various modes or protocols, examples of which include Transmission Control Protocol/Internet Protocol (TCP/IP), Global System for Mobile communication (GSM) voice calls, Short Electronic message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a BLUETOOTH, WiFi, Near Field Communication (NFC), or other such transceiver system.

Computing devices 102, 104, 106, 108, 110 enable respective users 122, 124, 126, 128, 130 to access and to view documents, e.g., Web pages included in Web sites. For example, user 122 of computing device 102 may view a Web page using a Web browser. The Web page may be provided to computing device 102 by server system 112, server system 114 or another server system (not shown).

In example environment 100, computing devices 102, 104, 106 are illustrated as desktop-type computing devices, computing device 108 is illustrated as a laptop-type computing device 108, and computing device 110 is illustrated as a mobile computing device. It is noted, however, that computing devices 102, 104, 106, 108, 110 may include, e.g., a desktop computer, a laptop computer, a handheld computer, a personal digital assistant (PDA), a cellular telephone, a network appliance, a camera, a smartphone, an enhanced general packet radio service (EGPRS) mobile phone, a media player, a navigation device, an electronic messaging device, a game console, or a combination of two or more of these data processing devices or other appropriate data processing devices. In some implementations, a computing device may be included as part of a motor vehicle (e.g., an automobile, an emergency vehicle (e.g., fire truck, ambulance), a bus).

Users interacting with computing devices 102, 104, 106, 108, 110 can participate in a social network 123 hosted, e.g., by server system 112, by uploading and downloading electronic content to the social network. The electronic content may include, e.g., electronic messages (e.g., e-mail, posts or instant messages), text comments (e.g., updates, announcements, replies), digital images, videos, audio files, and/or other appropriate information.

Generally, users interacting with computing devices 102, 104, 106, 108, 110 can also use social network 123 to define social circles (or other similar groups or lists) to organize and to categorize the user's relationships to other users of the social network. The social circles become part of the user's social connections. Electronic content can be distributed to social contacts (or simply "contacts") within social network 123, including one or more social circles, so that such content is viewable by the indicated contacts and/or contacts, or others. In an example operation, a user of social network 123 can generate a message and indicate, e.g., one or more individual social network contacts and/or social circles to which the generated message is to be sent. During a content write-time, a content data set (e.g., for an electronic message, post, or the like) is transmitted from the user's client computing device (e.g., computing device 102 of FIG. 1) to a distribution hub (e.g., a content distribution engine 125), which can be provided at a server (e.g., server system 112 of FIG. 1 or elsewhere on the network). In some implementations, the content data set may include content data (e.g., text, identity of the content author, uniform resource indicator (URI), author location, timestamp data (e.g., a timestamp indicating the time that the content was generated)), distribution data (e.g., data identifying contacts and/or one or more social circles), and identification (ID) data (e.g., an ID assigned to the content data set upon generation of the content).

In some implementations, other data can be appended to content data sets. Example other data can include scoring data. In some examples, scoring data can include a social affinity score among other possible scoring data. As described in more detail below, affinity identifies the closeness of parties on a social graph.

Figure 2:
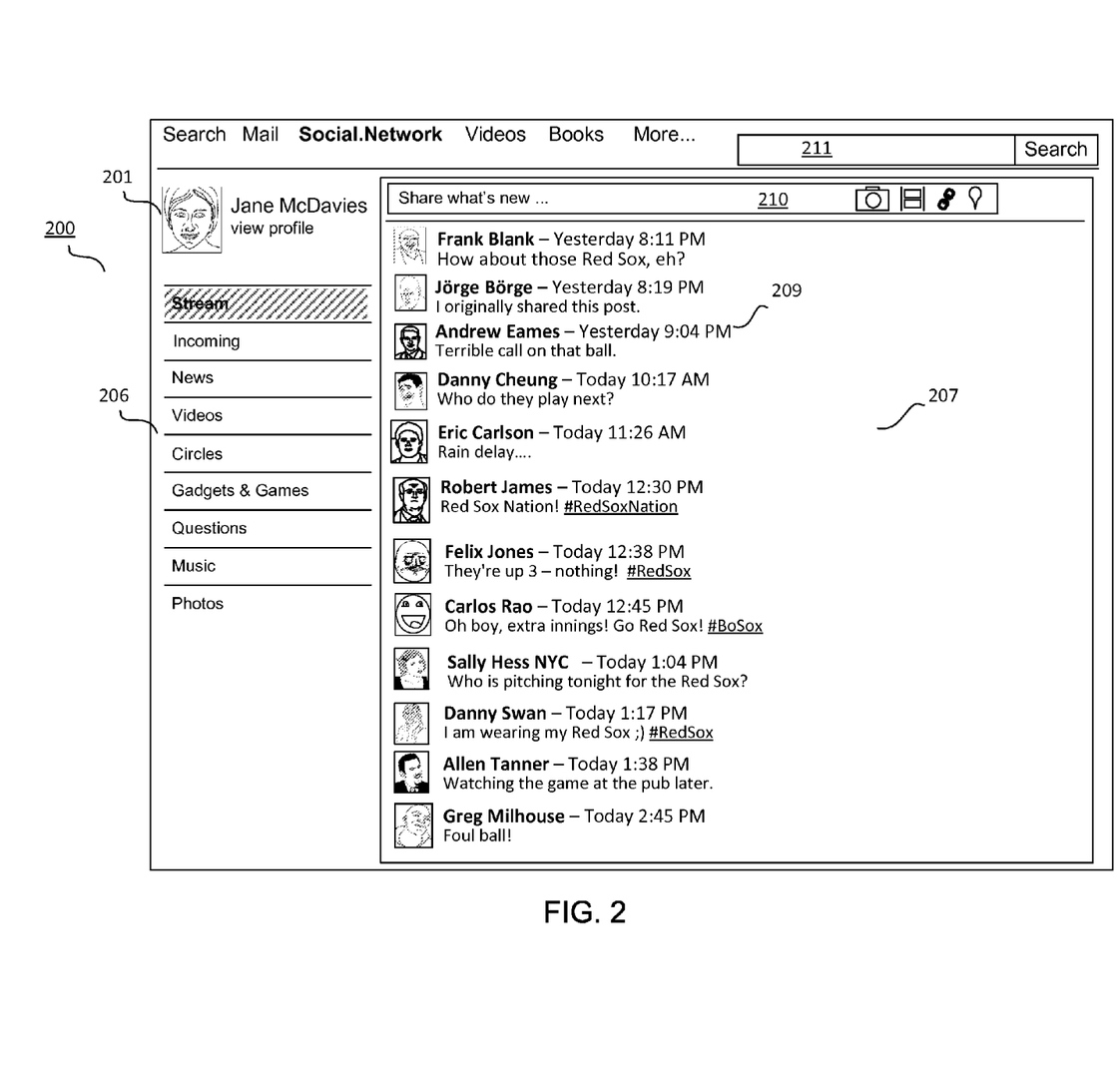
FIG. 2 shows an example of a main page for a user of a social network.

FIG. 2 shows an example main page 200 for a member of a social network. For example, page 200 can be provided as a Web page within a Web site of social network 123, and can display electronic content, including messages, that has been shared with a member 201 associated with the page 200. In the illustrated example, the member is "Jane McDavies" and page 200 displays, items (e.g., electronic content) that other members have shared with the member and/or items that the member has shared with other members. Page 200 also includes a social network menu 206 and a content stream 207, in which items of content are presented. Example content items 209 that have been sent to the member are displayed in the content stream. Generally, items 209 displayed in content stream 207 include electronic content that is distributed to the member from contacts established within the social network. A content sharing interface 210 can also be provided on page 200. The member can activate (e.g., click on) the interface 210 to input electronic content. Although twelve content items are depicted in FIG. 2, it is appreciated that page 200 can display more or less than twelve content items to the member. A search field 211 can also be provided on page 200 to search social network 123 for content.

Among other features, social network includes a messaging service, which allows users of the social networking service to communicate with each other electronically. In some examples, the messages will appear in the content stream, whereas in other examples there is a separate message interface (not shown).

Users of the social networking service also have profiles. In some cases, each user has a profile associated with their user name and password. The profile may have fields containing personal information, such as the user's home location (e.g., neighborhood, city, state, country, etc.) and the user's current location, if available. The user's current location may be determined, e.g. by obtaining, through a GPS service and with appropriate permission, geographic coordinates of the user's mobile device, and correlating those coordinates to specific geographic place name(s).

Figure 3:
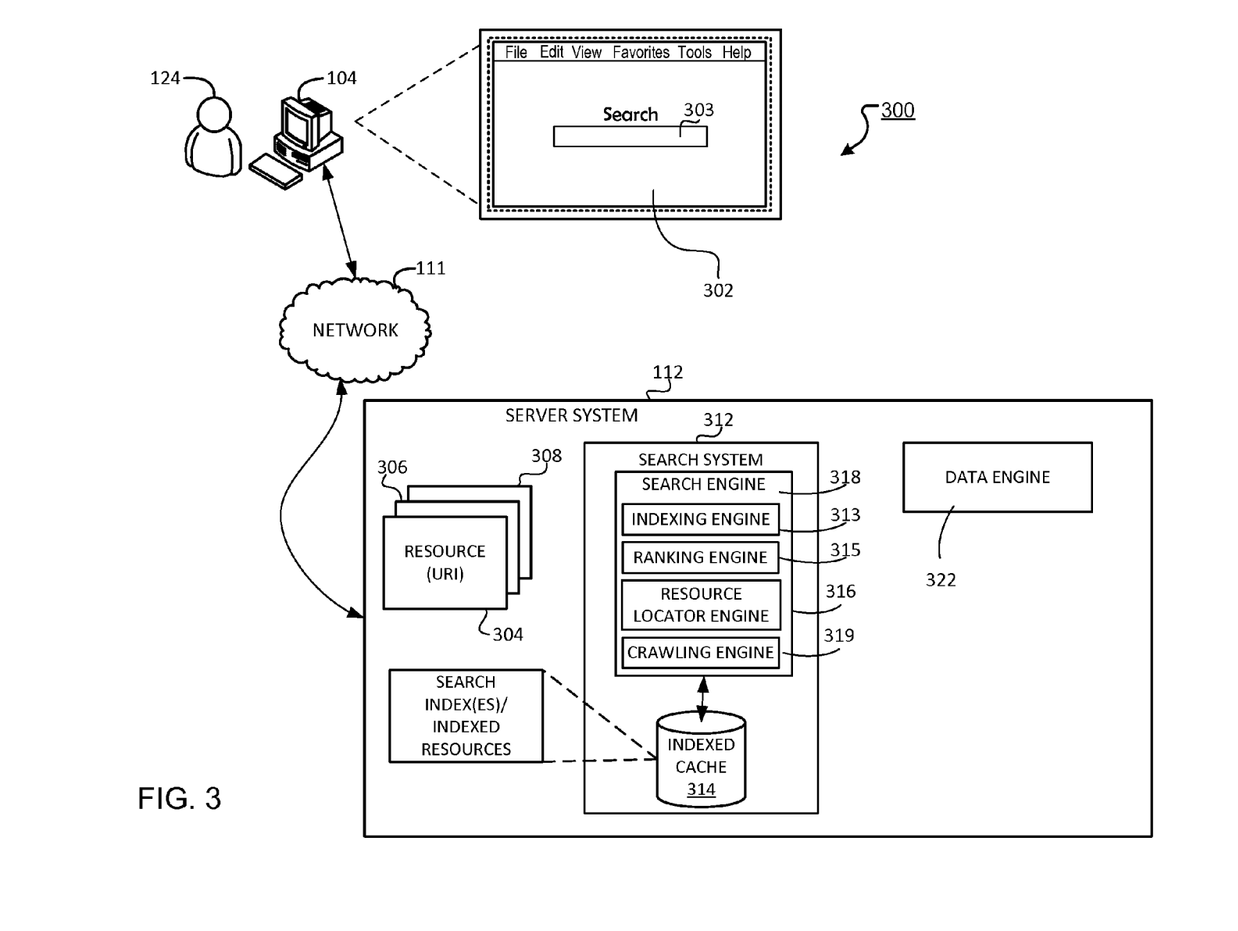
FIG. 3 is a block diagram of an example of part of the network environment of FIG. 1.

FIG. 3 is a block diagram of an example part of the network environment of FIG. 1. Specifically, FIG. 3 shows portion 300 of example network environment 100. In this example implementation, server system 112 stores resources 304, 306, 308. A resource has an associated resource identifier (Resource ID). For example, resources 304, 306, 308 may correspond to different Web pages of the same Web site, or may correspond to Web pages of different Web sites. As explained below, in this example operation, computing device 104 communicates with server system 112 to display a home Web page ("home page") 302 of a search engine Web site and/or a home page of a social network (e.g., page 200 of FIG. 2 containing the user's content stream).

To view a Web page, user 124 may input or select a Resource ID using a Web browser that is executed on computing device 104. The Resource ID may include, for example, a URI or a uniform resource locator (URL). A request including the Resource ID is transmitted from computing device 104 to server system 112 over network 111. In response, the server system identifies the requested resource based on the Resource ID, and transmits the requested resource to computing device 104 over network 111. For example, the resource may be home page 200 of social network 123 or a home page 302 of search system 312. In some implementations, search system 312 is part of social network 123 or it is independent thereof yet able to access content from social network 123.

Page 302 for search system 312 may include a field 303 for inputting a search query that is transmitted to the search system. Alternatively, the search query may be input through appropriate Web services. The search query may include, e.g., one or more terms, images, audio, video, or other content. In response, the search system performs a search of an indexed cache containing one or more search indexes, and returns search results to the user or other computer program (e.g., a messaging service). Search system 312 may be implemented, e.g., on server system 112 as shown or on other appropriate hardware. Search system 312 includes a search engine 318 and one or more search indexes.

Search system 312 includes a crawling engine 319 to crawl resources, and an indexing engine 313 to index those resources in one or more search indexes (referred to collectively as "search index") stored, e.g., in indexed cache 314. Search engine 318 also includes a resource locator engine 316 for identifying resources within the search index that are responsive to, and that may be relevant to, a query (for example, by implementing a query text matching routine). A ranking engine 315 ranks resources deemed relevant to the search query.

Social graph information may be included in a same search index as other resources or in a separate search index (not shown). As described in more detail below, the social graph information may include, e.g., comments, endorsements, connections, affinities, and so forth related to indexed content and to contacts on a user's social graph. The social graph information may include content from social network 123. A separate search may be performed for general search results responsive to a query, as well as particular search results, that identify resources associated with the user's social graph (e.g., endorsed Web content).

In some implementations, information associated with the user's social graph may be indexed by generating and incorporating suitable data structures, e.g., social restricts, into an existing search index. In some examples, the indexing engine may generate social restricts by mapping identified information to corresponding Web resources referenced in a search index and determining the social connection between the Web resources and the user. For example, the system may access a relationship lookup table that includes relationship data describing a user's social graph to determine such social connections. In some examples, social restricts may be provided in the form of an information tag or other data associated with a referenced Web resource included in the search index.

User-generated content (e.g., social network content) may be included in a same index as other resources or in a separate index, as noted above. In this regard, with appropriate permission, crawling engine 319 may crawl user-generated content (of both a searcher and others, e.g., members of the searcher's social graph), and indexing engine 313 may incorporate that content into an appropriate search index. Resource locator engine 316 may identify that user-generated content, including user profiles and other user-specific information (where permitted), based, e.g., on a relevance score of the user-generated content to a search query and based, e.g., on other information, including, e.g., the social connection of the searcher to the content itself or to an author of the content. In this regard, the existence or non-existence of a social connection to the content or author may affect the relevance score. In this context, an author is not limited to one who created the content, but may include, e.g., anyone who interacted with the content, shared the content, endorsed the content, posted the content, and so forth.

In response to a search query, search engine 318 may access indexed cache 314 to identify resources that are relevant to the search query. Resource locator engine 316 may identify resources in the form of search results and return the search results to a requesting device in search results pages. A search result may include data generated by search system 312 that identifies a resource, and may include the resource itself or a link to the resource, along with images, video, or other appropriate content. In some cases, the search results may include social information. For example, included with some of the search results may be, e.g., a member's location, comments, endorsements, or other information obtained about the member from a user's social graph. The search results may also include user-generated content displayed alone or in association with relevant social information (e.g., a link to a content author's profile). Search results may be used in the manner described herein to target messages to contacts in a vicinity.

As noted above, a social graph is a way to represent social connections between two parties that may, or may not, be on the same social network, and to represent connections between parties and content. A party may be an individual or an entity, e.g., a company, organization, country, or the like. Types of connections in social graphs may include, but are not limited to, other users to which a user is in direct contact (e.g., user messaging or chat contact, direct contacts on social sites) and users to which the user is in indirect contact (e.g., contacts of contacts, connections of users that have a direct connection to the user). In some examples, a direct connection may be unilateral or bilateral. In some implementations, a social graph includes content generated by individuals (e.g., blog posts, reviews) as connections to the user. The social graph may include connections within a single network or across multiple networks.

Distinct social graphs may be generated for different types of connections. For example, a user may be connected with chat contacts in one social graph, electronic message contacts in a second social graph, and connections from a particular social network in a third social graph. A social graph may include edges to additional parties at greater degrees of separation from the user. For example, an electronic message contact may have its own electronic message contacts to others adding a degree of separation from the user (e.g., user→electronic message contact→contact of electronic message contact). These contacts may, in turn, may have additional contacts at another degree of separation from the user. Similarly, a party's connection to someone in a particular social network may be used to identify additional connections based on that person's connections. Distinct social graphs may include edges connecting one or more social graph to one or more other social graphs. Thus, a social graph may include full social graph may include several different types of interconnected but distinct social graphs.

As noted, users may designate content as endorsed, share or comment on content, quote URLs, or otherwise indicate an interest or liking of content, examples of which include, but are not limited to, a particular resource, Web page, or search result. For example, an application, widget, or scripting may be provided in search results pages, Web pages, or within a browser application that allows a user to indicate liking, sharing, or other evaluation of an associated resource or search result. The user may mark the particular resource, Web site, or search results to indicate endorsement or other evaluation (e.g., through a browser control or user interface element presented with the associated content). Such relationships to information from others may be captured in a user's social graph.

Affinity between entities of a social graph may be represented by the above-noted edges in the user' social graph. As noted, affinity may identify the closeness of a party to a user. For example, a contact of a contact who has five common middle contacts with the user has more of an affinity with the user (e.g., is considered closer to the user) than a contact of a contact who has only one common middle contact. Factors in determining affinity may include, e.g.: how a contact is connected to the user (e.g., a source of a connection), which social networking site the contact is a member of, whether contact or contact of contact, and how many paths to get to the contact of a contact (e.g., common middle contacts). Edges may be weighted, either in a database containing the social graph or elsewhere, to reflect a level of affinity between connections (e.g., parties) in the social graph.

Affinity between parties may be content specific in some cases. For example, social graph data may identify specific types of content associated with an edge between parties and specific affinities for that content. In an example, the social graph data may specify that, between two connected parties, the first party has a first level of affinity for the second party's videos and a second, different level of affinity for the second party's written work. Similarly, the social graph may specify that the second party has a third, different level of affinity for the first party's blogs. The same is true for content subject matter. For example, the social graph data may specify that, between two connected parties, the first party has a first level of affinity for the second party's content about baseball and a second, different level of affinity for the second party's content about basketball.

Affinity may also be based on the user's interactions with members of the social graph (e.g., the frequency of interaction, the type of interaction, and so forth). For example, a user that frequently clicks on posts by a particular contact may be considered to be closer to that contact than to other contacts where they click on respective posts less frequently. Likewise, if a user frequently "mouses-over" content by an author (e.g., a search result link), but does not select that content, the degree of affinity may be less than if the link were selected. Similarly, an amount of time viewing content may be an indicator that one party likes content from another party. The amount of time viewing particular content may be an indication that one party likes that particular type of content from the other party, as opposed to other types of content from the other party.

In other examples, affinity may be defined by indirect interaction between users. For example, if two users interact with the same content regularly or frequently, those two users may be considered to have an affinity with one other. In still other examples, if two users interact with the same people regularly or frequently, those two users may be considered to have an affinity with one other.

Figure 4:
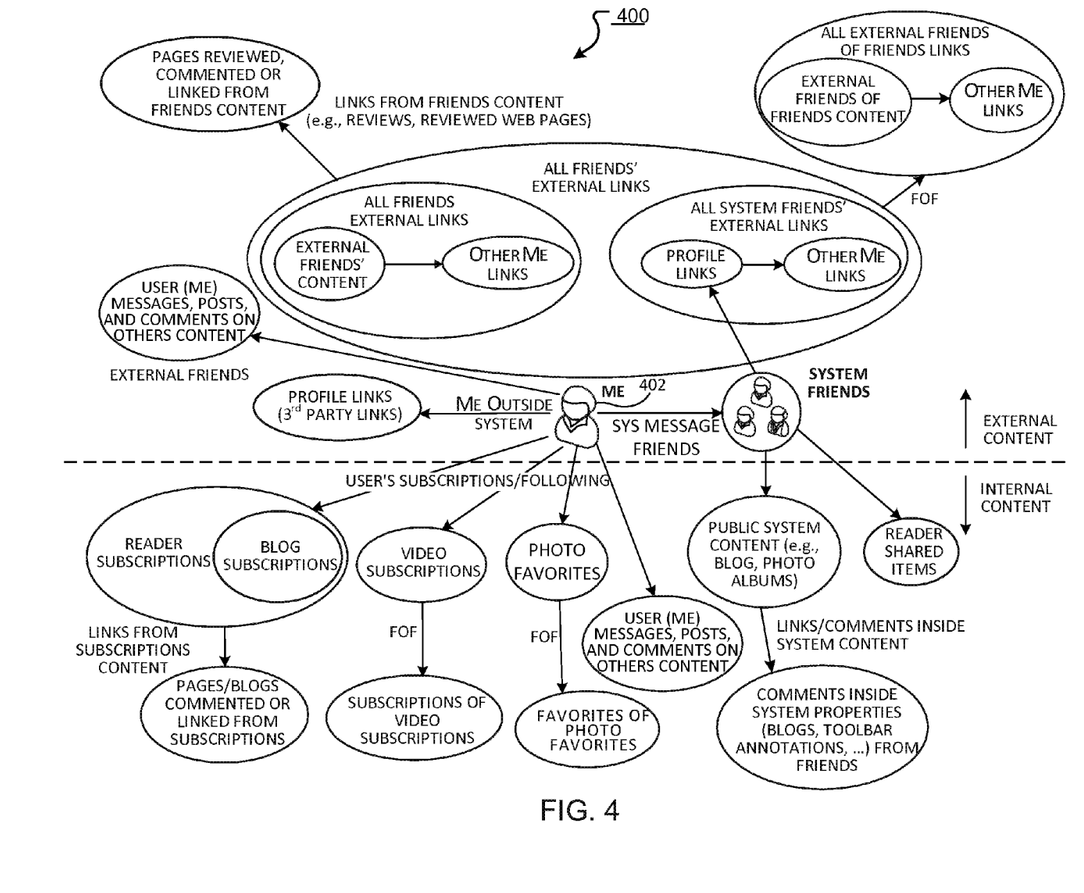
FIG. 4 is a conceptual view of an example of a social graph.

FIG. 4 is a conceptual view of an example social graph 400. Among other things, FIG. 4 shows sources of information for a social graph. In this example, the user's social graph is a collection of connections (e.g., users, resources/content, etc.) identified as having a relationship to the user 402 ("ME") within some degree of separation. The user's social graph may include parties and particular content at different degrees of separation. For example, the social graph of a user may include contacts, contacts of contacts (e.g., as defined by a user, social graphing site, or other metric), the user's social circle, people followed by the user (e.g., subscribed blogs, feeds, or Web sites), co-workers, and other specifically identified content of interest to the user (e.g., particular Web sites).

FIG. 4 shows that it is possible to extend the user's social graph to people and content both within a single network and across one or more external networks. For example, the user may have a profile or contacts list that includes a set of identified contacts, a set of interests, a set of links to external resources (e.g., Web pages), and subscriptions to content of a system (e.g., a system that provides various content and applications including electronic messages, chat, video, photo albums, feeds, or blogs). Likewise, blogs that include links to a user's contacts may be part of the user's social graph. These groups may be connected to other users or resources at another degree of separation from the user. For example, contacts of the user may have their own profiles that include connections to resources as well as contacts of the respective contacts, a set of interests, and so forth. In another example, a user may be connected to a social network account. That social network account may reference an article in a newspaper. A social connection, therefore, may be established between the user and the author of the article.

In some implementations, the connections to a user within a specified number of degrees of separation may be considered the bounds of the social graph of a user. Membership and degree of separation in the social graph may be based on other factors, including a frequency of interaction. For example, a frequency of interaction may be by the user (e.g., how often the user visits a particular social networking site) or it may be a type of interaction (e.g., endorsing, selecting, or not selecting items associated with contacts). As interactions change, the relationship of a particular contact in the social graph may also dynamically change. Thus, the social graph may be dynamic rather than static.

Social signals may be layered over the social graph (e.g., using weighted edges or other weights between connections in the social graph). These signals, for example, frequency of interaction or type of interaction between the user and a particular connection, may be used to weight particular connections in the social graph or social graphs without modifying the actual social graph connections. These weights may change as the interaction with the user changes.

Social graphs may be stored using suitable data structures (e.g., list or matrix type data structures). Information describing an aspect of a stored social graph may be considered relationship data. For example, relationship data may include information describing how particular members of a user's social graph are connected to a user (e.g., through what social path is a particular entity connected to the user). Relationship data may also include information describing social signals incorporated in the user's social graph. In some implementations, relationship data may be stored in a relationship lookup table (e.g., a hash table). Suitable keys for locating values (e.g., relationship data) within the lookup table may include information describing the identities of both a user and a member of the user's social graph. For example, a suitable key for locating relationship data within the lookup table may be (User X, User Y), where User Y is a member of User X's social graph.

Social graph information, including that described above, may be indexed for use in information retrieval. The social graph information may be part of a search index in the indexed cache 314 of FIG. 3. Accordingly, the search index may be searched to identify relevant search results that are dependent upon social signals, e.g., that are associated with one or more aspects of a user's social graph, examples of which are provided above. For example, a search system may receive a query and identify, e.g., general search results and user-generated content. The user-generated content may include, e.g., search results based on the indexed social graph information (e.g., content from electronic messages, posts, blogs, chats, etc. of members of the searcher's social graph). The indexed social graph information may be updated intermittently or periodically, for example, to include recently added information associated with the user's social graph (e.g., a user's current location, past location, future location, etc.). The indexed social graph information may also be updated, e.g., on an on-going basis to reflect relationships determined in accordance with the processes described herein.

A user may prevent addition of members to the user's social graph, e.g., using an option or by keeping contacts out of particular groups used to generate the social graph. In some implementations, privacy features provide a user with an option to allow or to prevent, respectively, being included (or remove the user if already included) as a member of another's social graph. Thus, users may have control over what personal information or connection information, if existing, is included in their social graphs and, consequently, that is included in the content streams and search results described herein.

Referring back to FIG. 1, in this example, mobile device 110 is located in Boston, Mass. A global positioning system (GPS) incorporated into, and used with, mobile device 110 identifies the current location of mobile device 110 using geographic coordinates. The GPS may also provide the place name of the current location of mobile device 110, in this example, Boston. Alternatively, a system other than the GPS may correlate the geographic coordinates to the place name. For example, in some implementations, assisted GPS (A-GPS), such as Cell Triangulation, are other mechanisms by which a mobile phone/user's location may be determined. Additionally, the IP address of a device may be used to determine approximated geographical location, using IPGeo services.

Identifiers may be used to augment the place names. For example, ZIP codes or area codes may be used to augment an actual name. In some implementations, such identifiers may be used instead of actual place names.

In any case, in this example, a name associated with the mobile device's current location (e.g., Boston) is used to identify contacts or other contacts in a user's social network that may be at, or within the vicinity of, that location. For example, the identity of the user and the name of the device's current geographic locations may be input as one or more search queries to search engine 318. Search engine 318, in particular, resource locator engine 316, may search index 314 to identify (i) social contacts of the user, and (ii) information about those social contacts, including their geographic location by name. If search engine 318 determines that the name of a contact's geographic location matches the name of the user's current location, then the user and the contact(s) are deemed to be at the same location and, as described below, a message can be sent to that contact.

In some cases, however, place names may not match even though two places are close geographically. For example, Boston and Cambridge are close geographically. However, a simple name search may not produce a match for Boston and Cambridge. Accordingly, a data engine 322 in server system 112 may resolve a location name into its geographic coordinates or other geographic identifier(s) (e.g., area code, ZIP code, or the like). Those geographic coordinates may be used to identify other areas (e.g., towns, cities, neighborhoods, ZIP codes, etc.) that are within a specified distance of the location name.

The names of these other areas may be associated with a group of places that are within the vicinity of the location that was originally specified above by its name. Accordingly, index 314 may be searched to identify contacts of the user who are at, or live at, locations whose names match any names within that group. As noted above, members' current locations may be identified (with permission) through geolocation of the members' mobile devices or by referencing a service that allows mobile device users to check-in to locations at particular times. Members may be given the opportunity to enable or disable these services.

A vicinity's boundaries may be set by the mobile device user (e.g., in their social network profile) or they may be set automatically by the social networking service. In some implementations, the boundary of a vicinity may be keyed to the subject of a message. For example, a message regarding an event in Boston, such as a Boston city council meeting, may only be of interest to social contacts who reside in Boston. In this case, search engine 318 may identify the subject of the message, and limit the boundary of the vicinity to Boston only. By contrast, a Red Sox game may be of interest to all social contacts within the Boston area, including, e.g., Boston, Cambridge, Somerville, the North Short, Cape Cod, etc. In this case, data engine 322 and search engine 318 may identify the subject of the message and expand the boundary of the vicinity to include all place names that are in eastern Massachusetts or beyond, depending upon the settings.

In this regard, data engine 322 may identify the subject matter of a message by parsing the message to identify key words for use in searching. The parsing may be performed using appropriate techniques. Words obtained through the parsing may be compared to subjects stored in a database, either inside or, or outside of, the social network 123, to thereby determine if the message relates to those subjects. The comparison may be made by keyword or other appropriate techniques. The database may correlate events or other occurrences to appropriate vicinities. For example, the database may specify that some events, such as a Red Sox game, have a vicinity of one size (e.g., all towns to the east of Springfield, Mass.), whereas other events, such as Boston-specific meetings, have a vicinity of another size (e.g., only the city of Boston proper).

The database may be populated, e.g., based on past actions of the user or based on past actions of other members of the social network. For example, the system may identify a threshold number of previous messaging requests relating to the "Red Sox", and determine an appropriate vicinity based on vicinities specified in prior messages by other members of the social network. The database may similarly be populated based on actions of the user himself or herself (e.g., based on past messaging operations relating to the topic "Red Sox"). For example, the system may identify a threshold number of previous messaging requests relating to the "Red Sox" by the user, and determine an appropriate vicinity based on vicinities specified in prior messages by the user. In other implementations, the user may specify, directly, the vicinities to which a message subject is to be sent. In some implementations, the target vicinity may be based on the user's current location. For example if it is determined that the user's current location is Boston, then the target vicinity may be eastern Massachusetts. On the other hand, if it is determined that the user's location is Seattle, and there is a Red Sox game in Seattle that evening, then the target location may be towns, cities, areas, and so forth proximate to Seattle. The vicinity, in this case, may be determined by identifying the current location as "Seattle", and referencing a database for towns, cities, and other areas that are predefined for that user as being within the vicinity of Seattle.

The user of mobile device 110 may send a message, e.g., through social network 123, only to contacts who are determined to be within the vicinity of the user at present. So, for example, user 130 may be in Boston and plan to attend a Red Sox game that evening. User 130 may use the processes described herein to identify social contacts who are in or around Boston or appropriate other towns of Massachusetts. A message inviting social contacts to that particular Red Sox game may thus be directed only to those contacts who are in or around Boston or appropriate other towns of Massachusetts. In some cases, the member may establish a social circle that includes contacts who are in or around Boston or appropriate other towns of Massachusetts, and send messages only to the contacts in that social circle.

In either case, contacts or other users who have no connection to Boston or its vicinity, will not be sent the message since, presumably, they would not be in a position to attend the Red Sox game that evening.

By restricting messaging in the manner described above, the amount of message traffic in the social networking service may be reduced. Furthermore, the user's contacts who have no connection to Boston are spared receiving messages that may not be relevant to them (e.g., a message to attend a sporting event in a city that they could not possibly reach in time).

Figure 5:
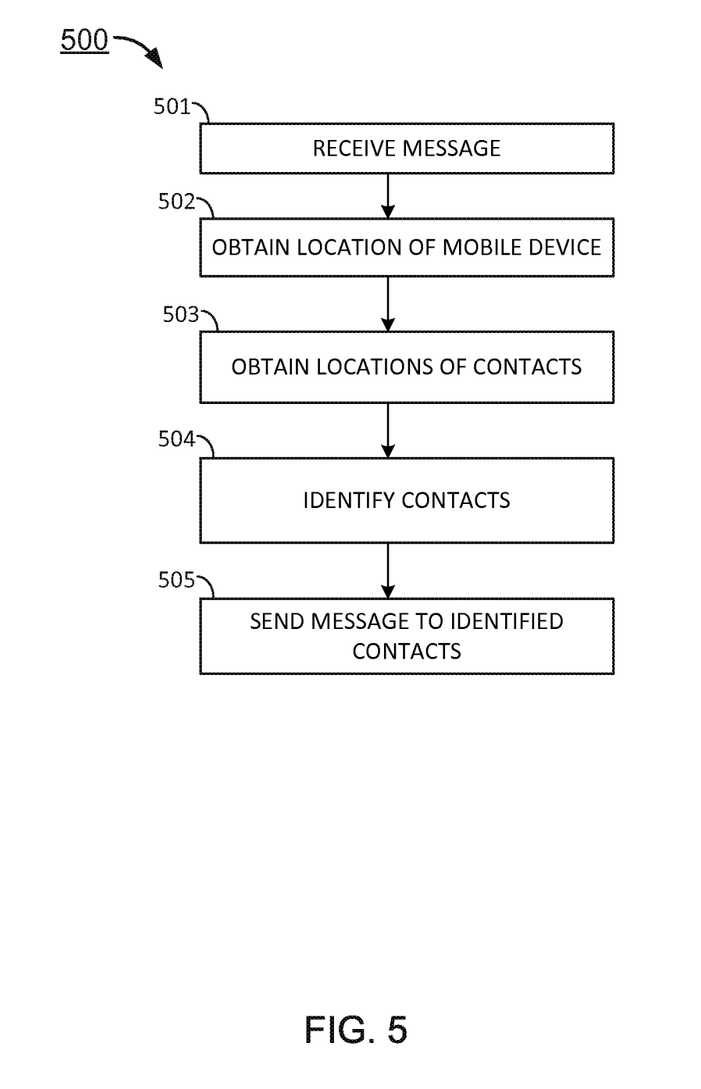
FIG. 5 is a flowchart showing an example of a process for sending communications to contacts on a social networking service.

FIG. 5 is a flowchart showing a process 500, such as that described conceptually with respect to FIG. 1, which may be performed by search engine 318 and data engine 322 in the network environment shown in FIGS. 1 and 3.

Referring to FIG. 5, a message is received (501), e.g., from mobile device 110. For example, data engine 322 may receive the message. That message is directed to contacts in the mobile device user's social network. The message may include, e.g., one or more fields indicating to which contacts the message is directed. For example, the message may indicate that it is to be directed to contacts in the same city, neighborhood, or area as the user. In some implementations, the message may specify one or more place names, e.g., Boston, Cambridge, Newton, etc. In some implementations, the message may contain no such information, and process 500 may determine to which contacts to direct the message based on the subject of the message, as described herein.

The location of mobile device 110 is obtained (502). This operation need not be performed if the message states that the mobile device users wants to send a message to contacts in the vicinity of a particular location, e.g., Boston. If, however, the message simply requests that that a message be sent to users in a vicinity of the mobile device user or does not specify a recipient(s), process 500 may obtain (502) a location of the mobile device user. In this regard, the mobile device may be equipped with software to communicate with a GPS (or other) system, thereby enabling the GPS (or other) system to determine the location of the mobile device. Process 500 may receive the coordinates periodically or with the received (501) message, or process 500 may have access to a database containing the coordinates. In other implementations, process 500 may have access to check-in information, which may identify the current location of the mobile device by geographic coordinates or place name. In cases where the current location is identified by geographic coordinates, process 500 (e.g., data engine 322) may correlate those geographic coordinates to one or more place names. Process 500 may perform the correlation using a local database or a remote service available on network 111.

The locations of contacts of the mobile device user on social network 123 are obtained (503). This information may be obtained, e.g., by searching the user's social graph in search index 314. For example, the information may be available in social contact profiles. In this regard, any appropriate content from the user's social graph may be searched, provided the owners of such content have provided appropriate permission. The information may include, e.g., the residence address of each contact, the current location of each contact, and other similar information. If the current locations of contacts are not available from their profiles, process 500 may use other location information from the profiles. Also, to the extent that process 500 has access to current geo-location information or check-in information for those contacts, process 500 may identify the place names of the current location of those contacts in the manner described above.

Contacts who are in a target location, e.g., the current vicinity of the mobile device user, are identified (504). For example search engine 318 may output a list of contacts who are, e.g., currently in a specified vicinity of the current location of the mobile device user or who live within that specified vicinity (as determined, e.g., by searching index 314). For example, as described above, data engine 322 may consult a database based, e.g., on the content of the initial message. That database may specify the extent of the vicinity in which to search for contacts. Information from that database (e.g., place names, ZIP codes, geographic coordinates, area codes, and so forth) may be incorporated into the search query and used to identify social contacts of the user who are in a specified vicinity.

Information from the user's social graph may be used to refine the list of contacts who are identified (504). For example, comments, endorsements, connections, affinities, and so forth that relate to the subject matter of (e.g., key words from) the message may be searched to identify members of the user's social graph in the predefined vicinity who have an interest in the subject of the message. For example, the user's social graph may be searched to identify contacts within the vicinity who have a particular affinity (e.g., within one or two nodes of the social graph) and who comment on, post, or are otherwise interested in the Red Sox. Those users who meet the specified criteria may be included on the contact list for messaging, and others may not.

According to process 500, a message is sent (505) to contacts in the contact list only, and not to other contacts, for whom the message will not likely be relevant. To this end, the identities of contacts in the contact list are provided to a messaging service by the search engine (either directly or through interaction with the user), and appropriate messages are formatted, and sent.

In some implementations, at least some of the foregoing operations may be performed automatically (e.g., without user interaction). For example, a user may send a message, such as "Meet me at the Red Sox game tonight", without specifying a target vicinity or recipients of the message. Process 500 may identify the subject of the message, identify members of the user's social graph in the vicinity of Boston who have an interest in sports, the Red Sox, baseball, etc., and automatically format and send a message to those users. The message may be a predefined type of message (e.g., a content stream post, an e-mail, an instant message, etc.), or the system may identify preferred method of communication for each person on the contact list and send the appropriate type of message. This information may be obtained, e.g., by searching the members' social graphs, profiles, or other database(s) available to the social network.

In other implementations, process 500 may be configured to identify the name of an event, to identify contacts within a vicinity of that event based on the name of the event, and to message only those contacts within the vicinity of the event. The processing described above may be used in this case, with event names (e.g., the Rolling Stones at Fenway Park) substituted for place names (e.g., Boston). However, the processing is substantially similar to that described above.

The system described herein may also include obtaining the location of many computing devices linked to many social networking users. For example, if a user is going to a Red Sox game, and the system finds that the user is on Lansdowne Street (a street near Fenway Park), the system will look for other users who have most recently been geo-located in the area of Lansdowne Street, or whose most recent check-in to a social network was in that area. The system may then send messages to those users in the manner described herein.

Figure 6:
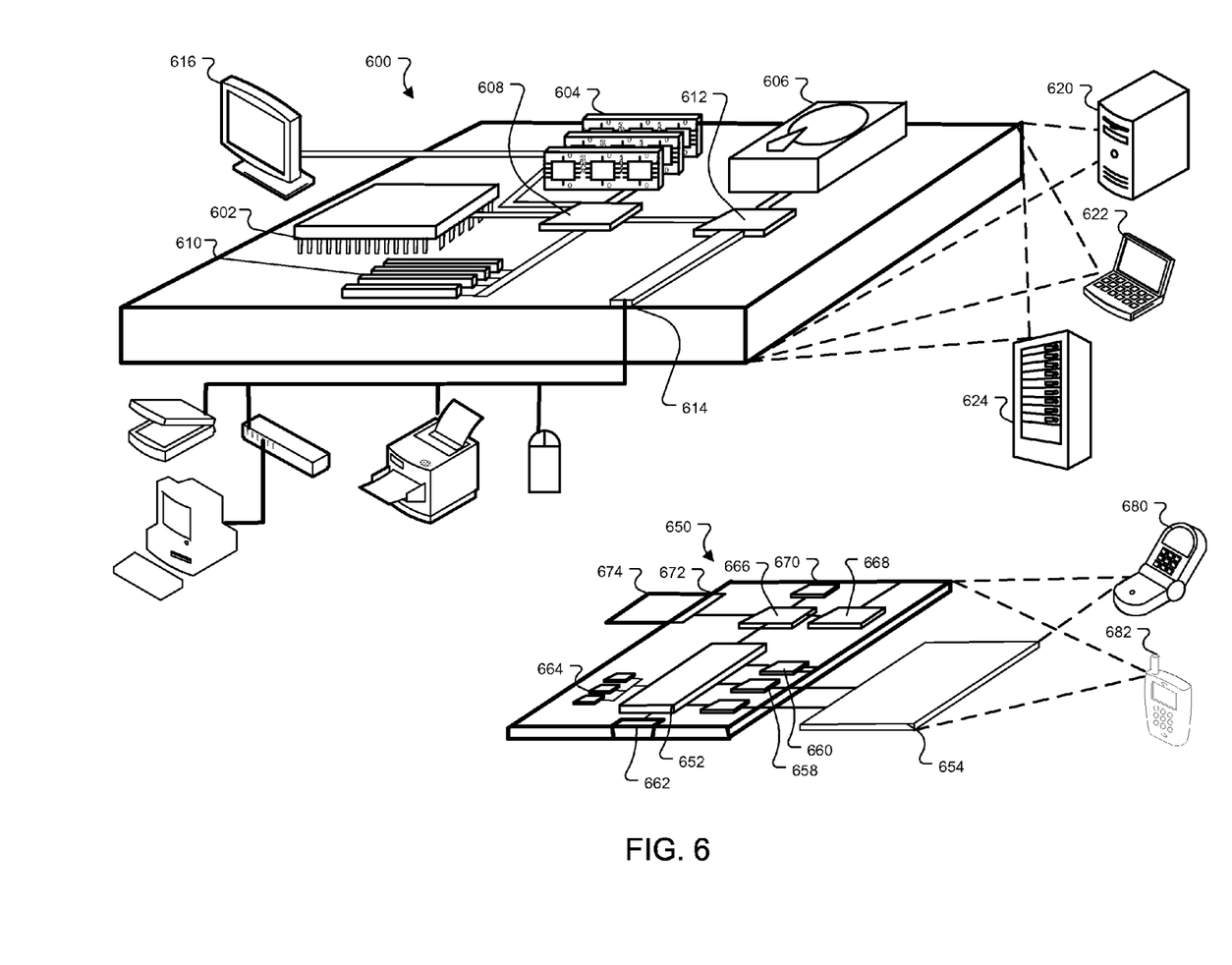
FIG. 6 shows examples of computing devices on which the processes described herein, or portions thereof, may be implemented.

FIG. 6 shows examples of computing devices on which the processes described herein, or portions thereof, may be implemented. In this regard, FIG. 6 shows an example of a generic computing device 600 and a generic mobile computing device 650, which may be used to implement all or part of the processes described herein. For example, server system 112 and social network 123 may be implemented on computing device 600. Mobile computing device 650 may represent a client device of FIG. 1. Other client devices of FIG. 1 may also have the architecture of computing device 600.

Computing device 600 is intended to represent various forms of digital computers, such as laptops, desktops, workstations, personal digital assistants, servers, blade servers, mainframes, data center scale computers, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various buses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable medium, such as the memory 604, the storage device 606, memory on processor 602, or a propagated signal. For example, the information carrier may be a non-transitory, machine-readable storage medium.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, BLUETOOTH, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a BLUETOOTH, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In the context of this application, "social network" and "social networking service" may be used interchangeably.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

In some examples, certain data may be anonymized in one or more ways before it is stored or used, so that personally identifiable information is removed. For example, a user's identity may be anonymized.

The processes described herein and variations thereof contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

For situations in which the systems discussed herein collect personal information about users, the users may be provided with an opportunity to enable/disable programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (for example, to a city, zip code, or state level), so that a particular location of the user cannot be determined.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A method comprising:
receiving a target geographical location of a computing device;
parsing a message for one or more keywords associated with the target geographical location of the computing device;
comparing one or more keywords of the message to subjects associated with a plurality of predefined rules;
based on the comparison, selecting one of the predefined rules that is associated with a subject corresponding to the one or more keywords;
identifying boundaries of a vicinity based on the target geographical location, the boundaries of the vicinity being defined by the selected one of the predefined rules;
creating a group comprising names of one or more locations that are within the boundaries of the vicinity;
using the group to identify a set of contacts from the contacts in the social network of the user, the set of contacts excluding one or more contacts in the social network of the user that are not associated with locations within the group;
creating a contact list, the contact list comprising contacts, from the set of contacts, that have commented on topics that relate to the message; and
sending the message to members of the contact list, the message relating to the target geographical location.

2. The method of claim 1, wherein identifying the set of contacts comprises:
  searching, among contacts in the social network of the user, for words associated with locations within the group; and
  selecting contacts who have the words associated with locations within the group.

3. The method of claim 1, wherein receiving the target geographical location comprises retrieving the target geographical location from an index that is accessible through the social networking service.

4. The method of claim 1, wherein receiving the target geographical location comprises:
  obtaining a current location of the computing device from a geo-location service; and
  correlating the current location to the target geographical location.

5. The method of claim 1, further comprising refining membership of the contact list based, at least in part, on a social graph of the user associated with the computing device.

6. The method of claim 1, wherein receiving the target geographical location comprises consulting a database comprising check-in information, the check-in information comprising a current location of the computing device, the current location being the target geographical location.

7. The method of claim 1, wherein the set of contacts comprise members of the social networking service who are known to be within the boundaries of the vicinity of the target geographical location.

8. The method of claim 1, wherein the message relates to an event at the target geographical location.

9. A method comprising:
  receiving a message directed to contacts in a social networking service, the contacts being within a social network of a user of a computing device;
  obtaining a target location of the computing device by parsing the message for one or more keywords associated with the target location of the computing device, the target location being defined by the one or more keywords associated with the target location;
  creating a group comprising location names of one or more locations that are within defined boundaries of a vicinity of the target location, the defining comprising:
    comparing the one or more keywords of the message to subjects associated with a plurality of predefined rules; and
    selecting, based on the comparison, one of the predefined rules that is associated with a subject corresponding to the one or more keywords;
  producing a contact list that includes one or more of the contacts that are affiliated with at least one of the location names within the group; and
  sending the message to the contact list, the message relating to the target location.

10. The method of claim 9, wherein obtaining the target location comprises retrieving the target location from a profile that is accessible through the social networking service.

11. The method of claim 9, wherein obtaining the target location comprises:
  obtaining a current location of the computing device using a geo-location service; and
  correlating the current location to the target location.

12. The method of claim 9, wherein the message relates to an event at the target location.

13. The method of claim 9, wherein the contact list comprises members of the social networking service who are known to be within the boundaries of the vicinity of the target location.

14. One or more non-transitory machine-readable media storing instructions that are executable to perform operations comprising:
  receiving a target geographical location of a computing device;
  parsing a message for one or more keywords associated with the target geographical location of the computing device;
  comparing one or more keywords of the message to subjects associated with a plurality of predefined rules;
  based on the comparison, selecting one of the predefined rules that is associated with a subject corresponding to the one or more keywords;
  identifying boundaries of a vicinity based on the target geographical location, the boundaries of the vicinity being defined by the selected one of the predefined rules;
  creating a group comprising names of one or more locations that are within the boundaries of the vicinity;
  using the group to identify a set of contacts from the contacts in the social network of the user, the set of contacts excluding one or more contacts in the social network of the user that are not associated with locations within the group;
  creating a contact list, the contact list comprising contacts, from the set of contacts, that have commented on topics that relate to the message; and
  sending the message to members of the contact list, the message relating to the target geographical location.

15. One or more non-transitory machine-readable media storing instructions that are executable to perform operations comprising:
  receiving a message directed to contacts in a social networking service, the contacts being within a social network of a user of a computing device;
  obtaining a target location of the computing device by parsing the message for one or more keywords associated with the target location of the computing device, the target location being defined by the one or more keywords associated with the target location;
  creating a group comprising location names of one or more locations that are within defined boundaries of a vicinity of the target location, the defining comprising:
    comparing the one or more keywords of the message to subjects associated with a plurality of predefined rules; and
    selecting, based on the comparison, one of the predefined rules that is associated with a subject corresponding to the one or more keywords;
  producing a contact list that includes one or more of the contacts that are affiliated with at least one of the location names within the group; and
  sending the message to the contact list, the message relating to the target location.

16. A system comprising:
  one or more non-transitory machine-readable media storing instructions that are executable; and
  one or more processing devices to execute the instructions to perform operations comprising:
    receiving a target geographical location of a computing device;

parsing a message for one or more keywords associated with the target geographical location of the computing device;

comparing one or more keywords of the message to subjects associated with a plurality of predefined rules;

based on the comparison, selecting one of the predefined rules that is associated with a subject corresponding to the one or more keywords;

identifying boundaries of a vicinity based on the target geographical location, the boundaries of the vicinity being defined by the selected one of the predefined rules;

creating a group comprising names of one or more locations that are within the boundaries of the vicinity;

using the group to identify a set of contacts from the contacts in the social network of the user, the set of contacts excluding one or more contacts in the social network of the user that are not associated with locations within the group;

creating a contact list, the contact list comprising contacts, from the set of contacts, that have commented on topics that relate to the message; and sending the message to members of the contact list, the message relating to the target geographical location.

17. The system of claim 16, wherein the operations comprise refining membership of the contact list based, at least in part, on a social graph of the user associated with the computing device.

18. A system comprising:

one or more non-transitory machine-readable media storing instructions that are executable; and one or more processing devices to execute the instructions to perform operations comprising:

receiving a message directed to contacts in a social networking service, the contacts being within a social network of a user of a computing device;

obtaining a target location of the computing device by parsing the message for one or more keywords associated with the target location of the computing device, the target location being defined by the one or more keywords associated with the target location;

creating a group comprising location names of one or more locations that are within defined boundaries of a vicinity of the target location, the defining comprising:

comparing the one or more keywords of the message to subjects associated with a plurality of predefined rules; and selecting, based on the comparison, one of the predefined rules that is associated with a subject corresponding to the one or more keywords;

producing a contact list that includes one or more of the contacts that are affiliated with at least one of the location names within the group; and sending the message to the contact list, the message relating to the target location.

* * * * *